US012592592B2

(12) United States Patent
Rossia

(10) Patent No.: US 12,592,592 B2
(45) Date of Patent: Mar. 31, 2026

(54) COOLING DEVICE FOR AN ELECTRIC MOTOR STATOR AND A MANUFACTURING PROCESS THEREOF

(71) Applicant: FPT INDUSTRIAL S.P.A., Turin (IT)

(72) Inventor: Giorgio Rossia, Turin (IT)

(73) Assignee: FPT INDUSTRIAL S.P.A., Turin (IT)

( * ) Notice: Subject to any disclaimer, the term of this patent is extended or adjusted under 35 U.S.C. 154(b) by 206 days.

(21) Appl. No.: 18/691,741

(22) PCT Filed: Sep. 20, 2022

(86) PCT No.: PCT/IB2022/058861
§ 371 (c)(1),
(2) Date: Mar. 13, 2024

(87) PCT Pub. No.: WO2023/042179
PCT Pub. Date: Mar. 23, 2023

(65) Prior Publication Data
US 2024/0380257 A1 Nov. 14, 2024

(30) Foreign Application Priority Data
Sep. 20, 2021 (IT) ........................ 102021000024065

(51) Int. Cl.
*H02K 1/20* (2006.01)
*H02K 5/20* (2006.01)
(Continued)

(52) U.S. Cl.
CPC .............. *H02K 1/20* (2013.01); *H02K 5/203* (2021.01); *H02K 15/02* (2013.01); *B33Y 10/00* (2014.12); *B33Y 80/00* (2014.12)

(58) Field of Classification Search
CPC .......... H02K 1/20; H02K 5/203; H02K 15/02; B33Y 10/00; B33Y 80/00
See application file for complete search history.

(56) References Cited

U.S. PATENT DOCUMENTS

2014/0246932 A1 9/2014 Chamberlin
2015/0035392 A1* 2/2015 Pal ........................ B64D 13/00
165/104.19

FOREIGN PATENT DOCUMENTS

DE 102016216019 A1 3/2018

OTHER PUBLICATIONS

International Search Report and Written Opinion in PCT Application No. PCT/IB2022/058861, mailed Jan. 3, 2023 (13 pages).

* cited by examiner

*Primary Examiner* — Sean Gugger
(74) *Attorney, Agent, or Firm* — Leason Ellis LLP

(57) ABSTRACT

A cooling device for a stator of an electric motor includes a first body having a first radially outer surface and a first radially inner surface extending about an axis so as to define a cavity adapted to axially receive the stator, and a second body distinct from the first body, fixed with respect to the first body, and having a tubular shape about said axis, so as to define a pair of further surfaces coaxial about said axis, one of which adheres in contact with a corresponding one of the first radially outer surface and the first radially inner surface, while the other has one or more grooves communicating so as to form a channel for a flow of fluid for cooling the stator, wherein the channel comprises at least one portion extending so as to guide the flow according to an axial advancing direction.

10 Claims, 5 Drawing Sheets

(51) Int. Cl.
 _H02K 15/02_ (2006.01)
 _B33Y 10/00_ (2015.01)
 _B33Y 80/00_ (2015.01)

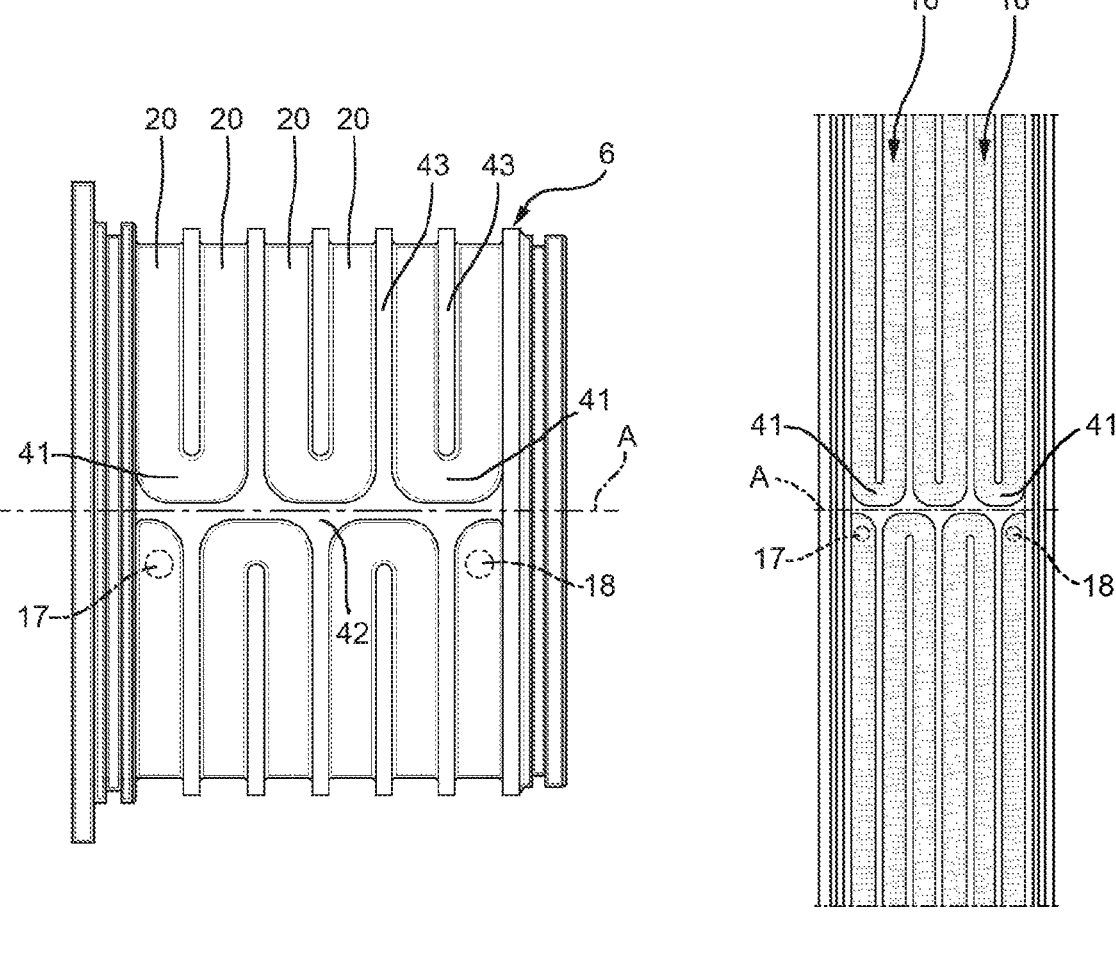
FIG. 9                          FIG. 10

COOLING DEVICE FOR AN ELECTRIC MOTOR STATOR AND A MANUFACTURING PROCESS THEREOF

CROSS-REFERENCE TO RELATED APPLICATIONS

This Patent Application a U.S. National Phase Application under 35 U.S.C. § 371 of International Patent Application No. PCT/IB2022/058861, filed on Sep. 20, 2022, which claims priority from Italian Patent Application No. 102021000024065, filed on Sep. 20, 2021, all of which are incorporated by reference, as if expressly set forth in their respective entireties herein.

TECHNICAL FIELD

The invention relates to a cooling device for an electric motor stator and a manufacturing process thereof.

STATE OF THE PRIOR ART

Cooling jackets are known to be cooling devices for cooling electrical machines, in particular their stators.

Typically, a cooling jacket defines a cylindrical outer casing, into which the stator is axially introduced.

The outer casing has an outer surface that is provided with grooves for the circulation of a cooling fluid, such as water or oil.

The grooves can commonly be obtained by machining the outer surface by chip removal, for example by milling or turning.

Chip removal machining allows the creation of grooves with various shapes, including spiral or serpentine shapes.

However, the costs of chip removal machining increase with the complexity of the shape of the grooves.

For this reason, according to the prior art, the grooves can be made directly by hot pressing the cooling jacket.

On the other hand, pressing the cooling jacket with complex shaped grooves is not in any case sufficiently simple and inexpensive. Furthermore, the accuracy with which the grooves are obtained is lower compared to chip removal machining.

Moreover, the well-known systems are difficult to adapt to different sizes of stators, making it necessary to increase manufacturing costs in order to provide specific solutions according to the size of the stator.

Therefore, there is a need to improve the well-known cooling devices towards an easier and cheaper manufacturability, while maintaining a comparable or even better-quality level.

One object of the invention is to meet the above need.

SUMMARY OF THE INVENTION

The object is achieved by means of a cooling device and a manufacturing process thereof as defined in the independent claims.

The dependent claims disclose particular embodiments of the invention.

BRIEF DESCRIPTION OF THE DRAWINGS

In the following, for a better understanding of the invention, some embodiments will be described by way of non-limiting example and with reference to the attached drawings, wherein:

FIGS. 9 and 10 are similar to FIGS. 3 and 4 and show an alternative to the component in FIGS. 3 and 4.

DETAILED DESCRIPTION OF THE INVENTION

Figures 1, 3, 4:
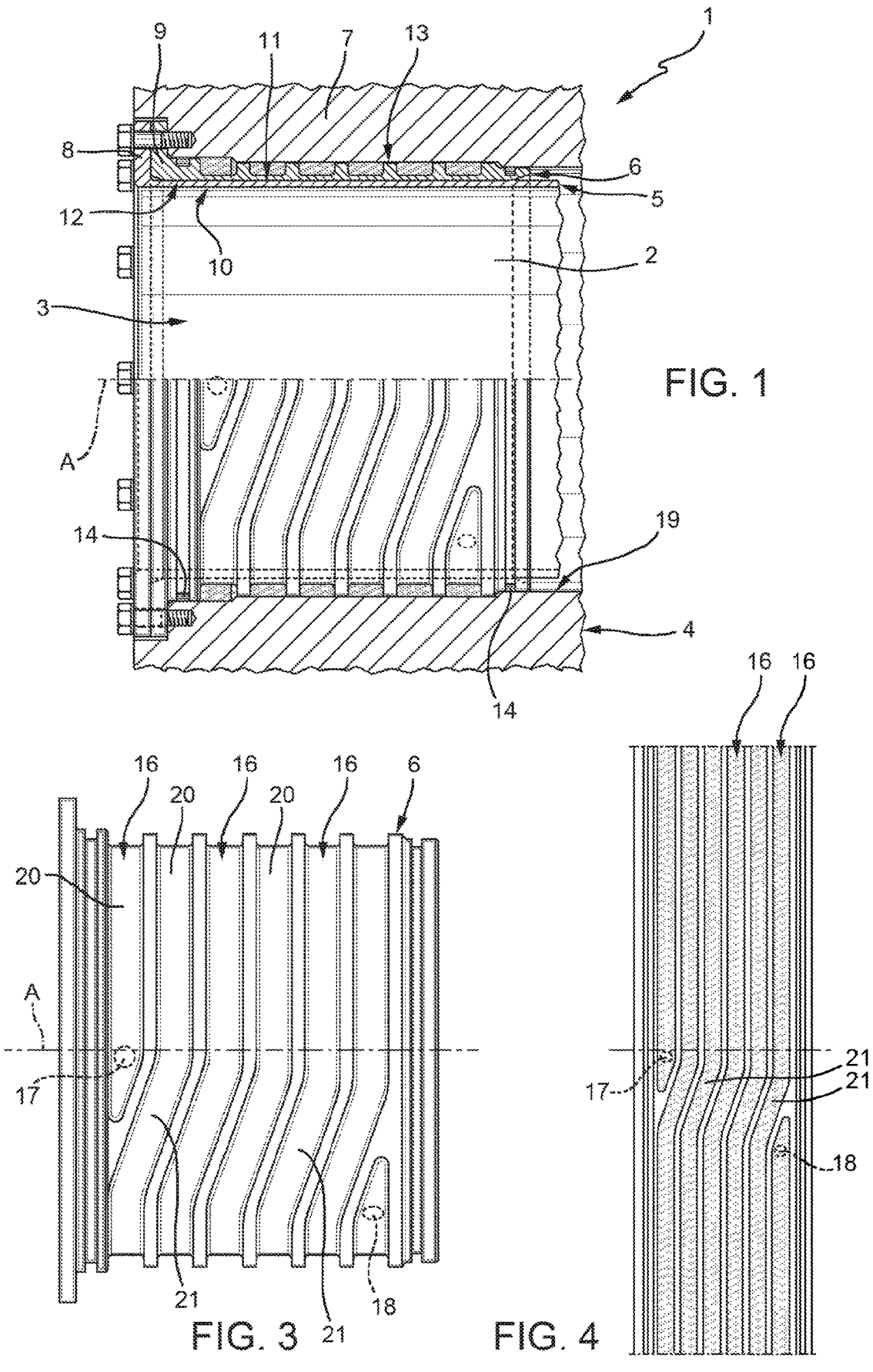
FIG. 1 is a plan view, with parts removed for clarity, of a stator assembly comprising a cooling device according to one embodiment of the invention.
FIG. 3 is a plan view of a component of the device in FIG. 1.
FIG. 4 shows the component in FIG. 2 extended in a plane.

FIG. 1 shows a stator assembly 1 according to a first example comprising a stator 2 of an electric machine 3, for example a motor, and a cooling device 4 for the stator 2.

The stator 2 is fixed to the device 4.

The electric machine 3 may optionally be included in the stator assembly 1.

The device 4 comprises a first body 5, in particular defining a tubular cooling jacket, a second body 6 fixed with respect to the first body 5, and preferably a third body 7, in particular defining an outer shell or casing, fixed with respect to both bodies 5, 6.

Each of the bodies 5, 6, 7 extends independently along the same axis A.

In the example in FIG. 1, the second body 6 is arranged radially between the bodies 5, 7.

For example, as shown in FIG. 1, the bodies 5, 6 have respective flanges 8, 9 at their axial ends. The flanges 8, 9 have respective opposite faces contacting each other. In addition, the flanges 8, 9 are also provided with respective series of axial through holes; the series match for the passage of threaded members, in this case tap bolts, to fix both the bodies 5, 6 to the body 7 in a pack configuration.

In particular, each of the flanges 8, 9 extends radially outwards, i.e., away from the axis A.

In this way, the bodies 5, 6 are also fixed to each other. However, the configuration in FIG. 1 is only exemplary: the bodies 5, 6 can be fixed to each other in many known ways, such as by interference or welding, optionally with the flanges 8, 9 missing.

Similarly, the bodies 5, 6 fixed to each other in any way can then in turn be fixed to the body 7, for example by means of threaded connections, optionally also, but not necessarily, via the flanges 8, 9.

Figure 2:
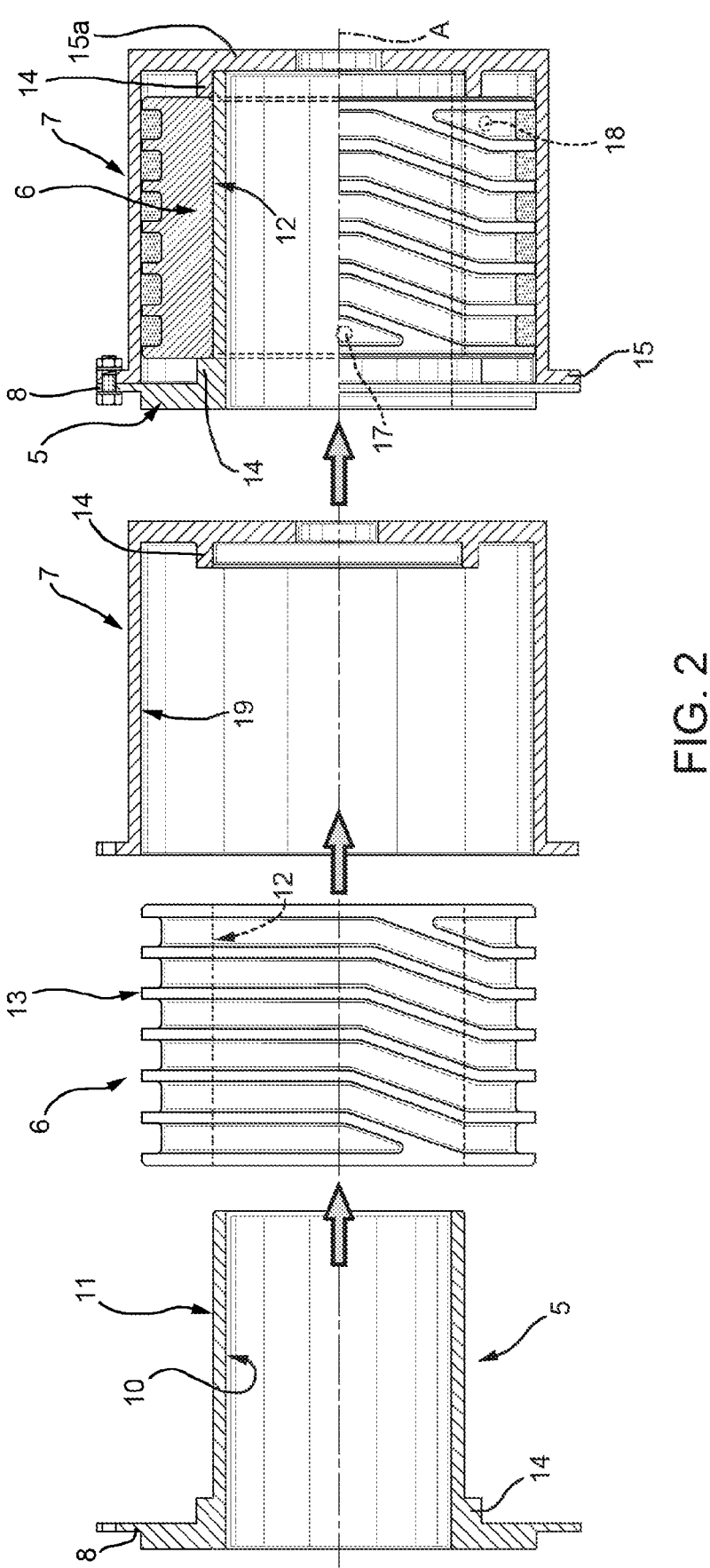
FIG. 2 shows a variant of the device in FIG. 1.

Alternatively, or additionally, as in the variant in FIG. 2, the body 5 can be fixed to the body 7, e.g., by means of threaded members, optionally, but not necessarily, by means of the flange 8 and conveniently by means of a corresponding flange 15 on the body 7, which preferably extends outwards, i.e., away from the axis A. The body 6 can be fixed to the bodies 5, 7, even without threaded members, as it is arranged radially and axially between the bodies 5, 7, particularly in a pack configuration, i.e., with the body 6 axially constrained by the bodies 5, 7.

In other words, for example, the body 6 can be pressed by the bodies 5, 7, or simply constrained in contact therewith at the opposite axial ends of the body 6. For example, one of the axial ends is pressed by the body 7 or the body 5 towards the other end, and the latter is in contact with the body 5 or the body 7, respectively. Or the axial ends are constrained by the bodies 5, 7, respectively.

For example, the body 7 may have a bell shape, optionally with one axial end open and the opposite axial end closed or comprising a 15° wall extending radially inwards, i.e., towards the axis A. Preferably, the open axial end carries the flange 15, for connection to the flange 8, and is suitable for inserting the bodies 5, 6 into the body 7.

The first body 5 has a radially inner surface 10 and a radially outer surface 11. The latter extends about an axis A so as to define a cavity adapted to axially receive the stator 2. Specifically, the radially outer surface 11 also extends about the axis A. In particular, the cavity is cylindrical, so the radially inner surface 10 and more particularly the radially outer surface 11, too, are lateral surfaces of respective cylinders. However, more generally, the cavity and/or each of the surfaces 10, 11 may take a variety of shapes other than those shown.

The second body 6, distinct from the first body 5, has a tubular shape about the axis A. Therefore, the second body 6 defines two surfaces 12, 13 coaxial about the axis A, specifically a radially internal surface and a radially external surface, respectively.

In particular, the second body 6 is cylindrical, although it may also take on other different shapes according to examples not shown.

The surface 12, in particular in its entirety, adheres in contact with the surface 11. In other words, in particular, the surface 12 is an essentially smooth surface, i.e., without grooves. The term "essentially smooth" is used herein to identify a smooth surface apart from the natural surface roughness that characterizes any real surface.

Therefore, as shown in FIG. 1, the body 6 is fitted on the body 5.

The body 5 is radially more internal than the body 6 and the surface 12 defines a heat exchange surface to come into thermal contact with the stator 2 housed in the body 5.

The surface 13 has a plurality of grooves 16 communicating with each other so as to at least contribute to the formation of a channel, specifically completed or closed by the third body 7, in particular arranged around the body 6 in a radially outer position than the axis A.

The channel is configured to allow a flow of fluid for cooling the stator 2, more specifically from a fluid inlet 17 to a fluid outlet 18. The flow can be a flow of any cooling fluid, such as oil or more preferably water.

The body 7 comprises two openings, not shown, corresponding to the fluid inlet 17 and the fluid outlet 18, respectively, for introducing the fluid into the channel and allowing the fluid to exit the channel.

More specifically, the body 7 has a surface 19, precisely an inner surface, which extends about the axis A and adheres to parts of the surface 13 other than the grooves 16. On the other hand, the surface 19 has respective portions at the grooves 16 defining as many stretches of the channel with the grooves 16. In other words, the third body 7 forms a wall of the channel adapted to be lapped by the flow, which correspondingly laps the grooves 16.

Therefore, the surface 19, too, defines a cavity adapted to axially receive the bodies 5, 6, as well as the stator 2. In addition, the body 7 has a radially outer surface that is not shown.

In particular, the surface 19 is essentially smooth, and more particularly cylindrical, i.e., defining the lateral surface of a cylinder.

Figures 5, 11:
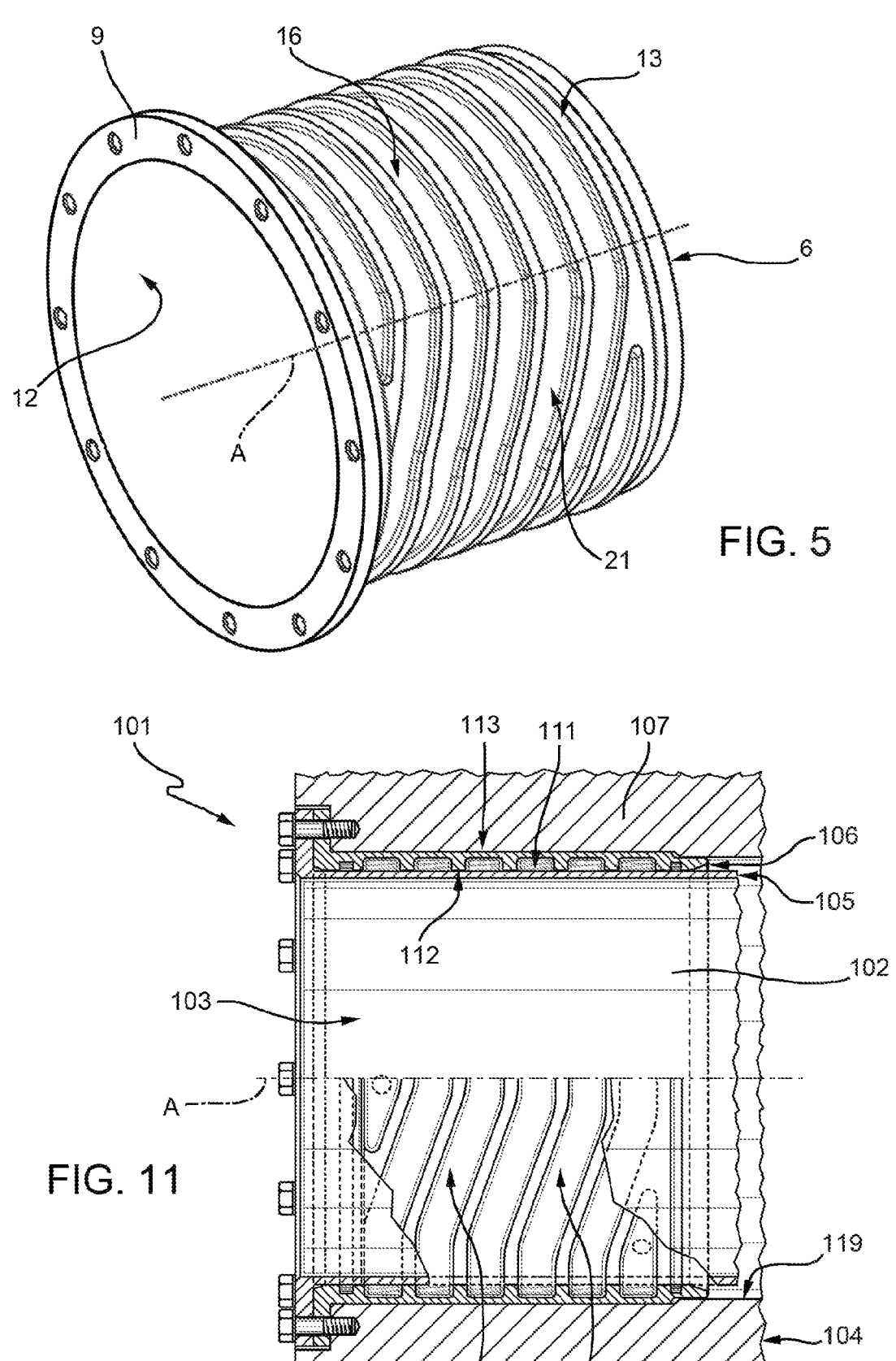
FIG. 5 is a perspective view, on an enlarged scale, of the component in FIG. 2.
FIG. 11 is similar to FIG. 1 and shows a stator assembly comprising a cooling device according to a further embodiment of the invention.

The body 6 of this description, which is best seen in FIGS. 3 and 5, is manufactured using an additive manufacturing process, although this is not necessary. A number of well-known additive manufacturing techniques can be used, such as electron beam melting, which is known to be suitable for the manufacture of metal components.

The body 6 is made of a material capable of conducting heat in order to allow the body 5 and thus, in turn, the stator 2 housed in the body 5, to cool down. For example, the material of the body 6 may include a metal, but not necessarily. In fact, the material of the body 6 may include heat-conductive, heat-resistant plastic resins.

Alternatively, or additionally, the body 6 may include a metal foam, such as aluminium. In this case, the body 6 can be manufactured using techniques other than additive manufacturing techniques, which are typical for the manufacture of metal foams.

The body 7 is fixed to the body 6 in a fluid-tight manner, e.g., by means of gaskets 14, to prevent the cooling fluid from leaking out of the channel in an undesirable manner, i.e., specifically in areas other than the fluid outlet 18.

The channel is designed to include at least one portion extending so as to guide the flow according to an axial advancing direction, i.e., parallel to the axis A.

In particular, the channel starts at the fluid inlet 17 and ends at the fluid outlet 18.

The channel configuration is clearly visible in FIG. 4.

According to the example in FIG. 1, the grooves 16 of the channel comprise circumferential grooves 20 configured to guide the flow according to respective circumferential directions about the axis A and a plurality of axially advancing grooves 21, each one configured to transfer the flow between axially adjacent grooves 20.

More specifically, the circumferential directions lie in respective distinct planes arranged in succession along the axis A, in particular with a regular, e.g., constant, pitch. Clearly, the planes are orthogonal to the axis A.

Advantageously, each of the grooves 21 extends obliquely between the corresponding adjacent grooves 20. "Obliquely" means not parallel or orthogonal to the axis A. In practice, each of the grooves 21 forms, with the corresponding adjacent grooves 20, an S-shaped or sigmoid-shaped profile, or a profile comprising at least one flex, precisely two flexes.

In the example in FIG. 1, the grooves 21 all have the same circumferential position about the axis A. However, the grooves 21 could also have a different arrangement: for example, the grooves 21 could be arranged in a pattern advancing in the circumferential direction, more particularly according to a uniform angular pitch. In other words, two successive grooves 21 along the axis A have respective circumferential positions offset by an angle, more particularly equal to the uniform angular pitch.

According to further examples, the channel could have completely different shapes from the example in FIG. 1.

Figures 6, 7, 8:
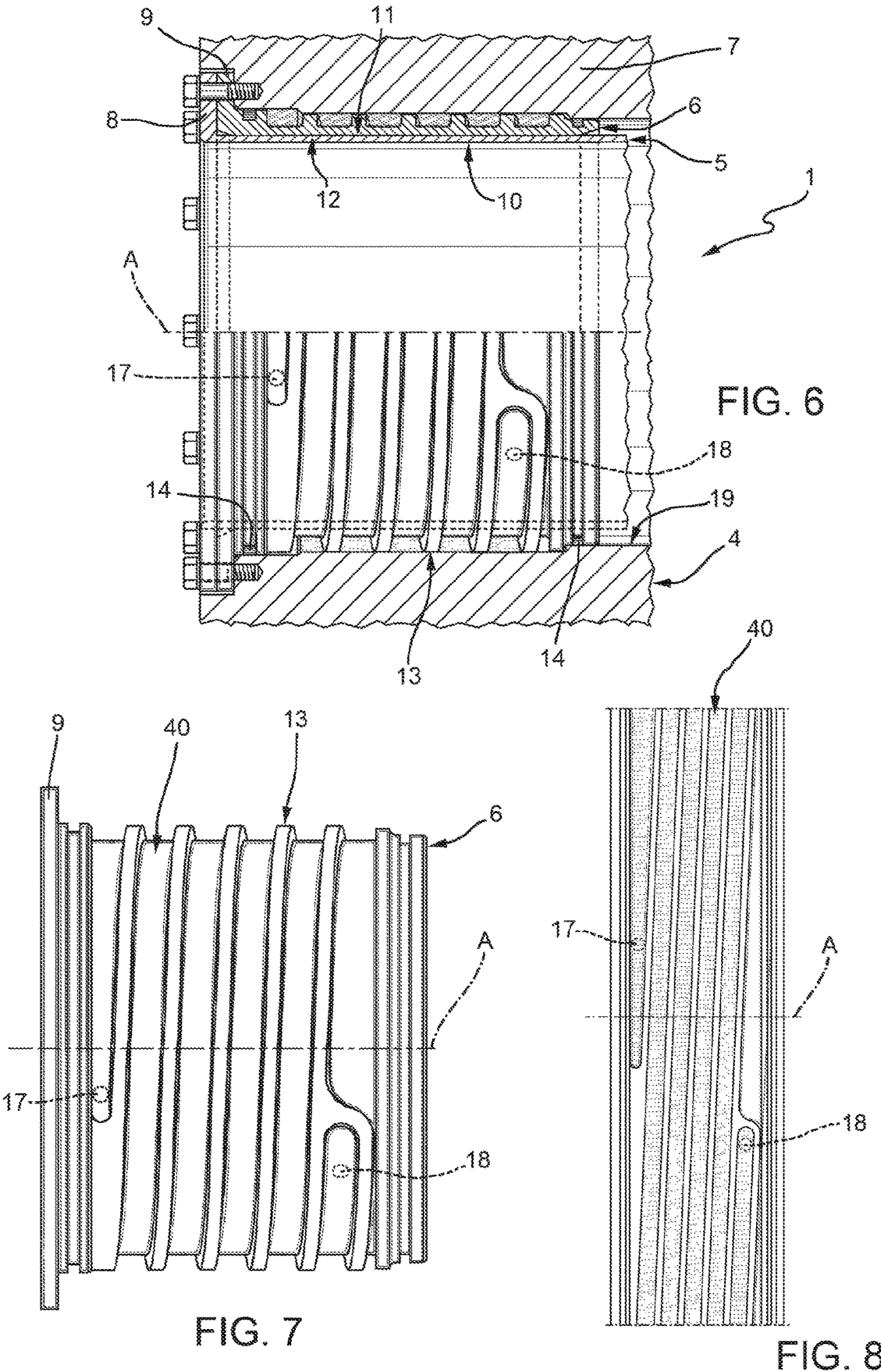
FIGS. 6, 7, 8 are similar to FIGS. 1, 3, 4 and show a stator assembly comprising a cooling device according to a further embodiment of the invention.

In particular, in the example in FIGS. 6-8, the channel has a helical or spiral shape. That is, the channel comprises a helical or spiral shaped groove 40 about the axis A. In this case, the groove 40 defines a single continuous groove forming the channel.

The example in FIGS. 6-8 differs from the example in FIG. 1 only in the presence of the groove 40 in place of the grooves 20, 21. Therefore, this last example will not be described in further detail, but reference will be made to what has already been described above. In FIGS. 6-8, the same numbers as in FIGS. 1-4 indicate the same components as shown therein.

In addition, FIGS. 9 and 10 show a further example that is similar to the examples shown so far and therefore will be described only in so far as it differs from them. Where possible, the same reference numbers already introduced will be used to indicate the same components as those already described in the above examples.

Specifically, the additional example differs only in the shape of the channel. In particular, the shape of the channel is such that it creates a serpentine path for the flow.

Therefore, the grooves 20 are retained, whereas the grooves 21 are replaced by the grooves 41 extending parallel to the axis A, rather than obliquely.

Preferably, the grooves 41 are arranged so that the body 6 defines a partition 42 parallel to the axis A intended for contact with the flow at both its sides.

The grooves 20 are axially separated from each other by ring-shaped separation walls 43; each of the separation walls 43 is provided with an opening defining a corresponding one of the grooves 41 near the partition 42. In other words, in greater detail, the partition 42 delimits one side of the grooves 41, while the other side thereof is delimited by the separation walls 43, respectively.

In particular, following the direction of the axis A, the grooves 41 are arranged alternately on one side and the other of the partition 42.

In this way, the flow reverses its advancing direction each time it passes from one of the grooves 20 to another adjacent one of the same grooves 20.

Two adjacent grooves 20, together with the groove 41 connecting them, form a U-shaped path.

However, this is not limiting; in fact, the partition 42 is not necessary, nor is it necessary for the flow to reverse its direction.

FIG. 11 shows a stator assembly 101 according to a further example comprising a stator 102 similar to the stator 2, and a cooling device 104 for the stator 102.

The device 104 includes a body 105 similar to the body 5, a body 106 fixed with respect to the body 105, and preferably a body 107 similar to the body 7 and fixed with respect to both the bodies 105, 106.

The body 106 is similar to the body 6 but differs from the latter only in the surfaces 112, 113, which are reversed with respect to the surfaces 12, 13.

In fact, in other words, the surface 113, which is radially more external than the surface 112, adheres in contact with a surface 119 of the body 117 corresponding to the surface 19 of the body 17. The surface 113 is essentially smooth or has no grooves.

On the other hand, the surface 112 is radially internal and has a plurality of grooves 116 which form the channel like the grooves 16. Specifically, the channel is completed or closed by the body 115 on which, in particular, the body 116 is fitted.

The surface 112 faces a surface 111 of the body 105 corresponding to the surface 11 of the body 5.

The channel can take many shapes and configurations in much the same way as described above for the other examples. That is, for example, the channel can define a helical or serpentine path. In the example in FIG. 10, the channel has a similar configuration as in the example in FIG. 1.

All the remaining features of the bodies 105, 106, 107 can be derived from the corresponding bodies 5, 6, 7 of the other examples.

In particular, the body 106 is also manufactured by an additive manufacturing process.

The body 107 may also be considered not to be part of the stator assembly 101 or the device 104. In other words, the body 107 may also be missing.

Therefore, the presence of the body 107 is not necessary to define the example in FIG. 11; the indication that the radially innermost surface 112 of the body 106 comprises the grooves 116 is sufficient.

Thus, in summary, according to the example in FIG. 11, the device 104 comprises the body 105 having a radially outer surface 110 and a radially inner surface 111 extending about an axis A' so as to define a cavity adapted to axially receive the stator 102. In addition, the device 104 comprises the body 106 fixed to the body 105 and having a tubular shape about the axis A' so as to define the surfaces 112, 113 coaxial about the axis A', of which the surface 112 is radially more internal and has the grooves 116 communicating to form the channel.

In particular, the surface 111 adheres to parts of the surface 112 other than the grooves 116. In other words, the body 115 defines a wall of the channel adapted to be lapped by the flow. This last wall defines the cavity adapted to axially receive the stator 102 and is designed to come into thermal contact with the stator 102 inside the cavity.

Clearly, the body 107, too, defines a cavity with the surface 119 adapted to axially receive the stator 102.

The invention is also related to a method for manufacturing the bodies 6, 106, wherein the same bodies 6, 106 are manufactured using additive manufacturing methods and then fixed to the respective bodies 5, 105.

The advantages of the devices 4, 104 and of the method according to the invention are clear from the foregoing.

In particular, additive manufacturing techniques allow enormous versatility to create all types of channel geometries at a much lower cost than die-casting or chip removal machining, especially in the case of particularly complex geometries.

The devices 4, 104 can be easily assembled, e.g., by means of ordinary threaded members. So, the simplicity of the devices 4, 104 and their manufacture is remarkable.

Furthermore, the three bodies connected together allow a solution that can be adapted to different sizes of stators in a cost-effective manner.

Lastly, it is clear that modifications and variations may be made to the devices 4, 104 and the method according to the present invention, without however departing from the scope of protection defined by the claims.

In particular, the individual features of each of the embodiments or variants described herein can be combined with each other to form further embodiments according to the invention.

The invention claimed is:

1. A cooling device for a stator of an electric motor comprising:
    a first body having a first radially outer surface and a first radially inner surface extending about an axis so as to define a cavity adapted to axially receive the stator;
    a second body distinct from the first body, fixed with respect to the first body, and having a tubular shape about said axis, so as to define a pair of further surfaces coaxial about said axis, one of which adheres in contact with a corresponding one of the first radially outer surface and the first radially inner surface, while the other has one or more grooves communicating so as to form a channel for a flow of fluid for cooling the stator;

a third body fixed with respect to the first and second bodies, as well as having a third surface extending about said axis adhering in contact with said other one of the further surfaces so that the third body forms a wall of the channel adapted to be lapped by the flow;

wherein the channel comprises at least one portion extending so as to guide the flow according to an axial advancing direction;

wherein said other one of the further surfaces is radially external, so that the first body is radially internal to the second body and defines a cooling jacket for the stator, so that the first radially inner surface is a heat exchange surface for making thermal contact with the stator inside the cavity.

2. The device according to claim 1, wherein said other one of the further surfaces is radially internal, so that the first body is radially external to the second body and defines an outer casing for the third body defining a cooling jacket for the stator, so that the wall defines a further cavity inside the previously said cavity and in turn adapted to internally receive the stator; the wall being a heat exchange wall for making thermal contact with the stator inside the further cavity.

3. The device according to claim 1, wherein the channel comprises a helical or spiral shaped groove about said axis.

4. The device according to claim 1, wherein the channel comprises a plurality of circumferential grooves for guiding the flow according to respective circumferential directions around the said axis and a plurality of axially advancing grooves each adapted to transfer the flow between axially adjacent grooves of the circumferential grooves.

5. The device according to claim 4, wherein the circumferential directions lie in respective distinct planes arranged in succession along the said axis and orthogonally thereto.

6. The device according to claim 4, wherein each of the axially advancing grooves extends obliquely between the axially adjacent grooves of the circumferential grooves.

7. The device according to claim 4, wherein the axially advancing grooves extend parallel to said axis.

8. The device according to claim 1, wherein the second body is made by means of an additive manufacturing technique.

9. A method for manufacturing a device according to claim 1, the method comprising the steps of:

manufacturing the second body by means of an additive manufacturing technique, and fixing the second body to the first body.

10. A stator assembly comprising a device according to claim 1 and an electric motor stator fixed to the device inside of the said cavity.

* * * * *